UNITED STATES PATENT OFFICE.

FRITZ KOCH, OF LONDON, ENGLAND.

MANUFACTURE OF CAMPHENE.

No. 870,829.          Specification of Letters Patent.          Patented Nov. 12, 1907.

Application filed November 24, 1906. Serial No. 344,874.

*To all whom it may concern:*

Be it known that I, FRITZ KOCH, Ph. D., a citizen of Germany, residing in London, in the county of Middlesex, England, have invented a new and useful Improvement in the Process of Manufacture of Camphene, to be particularly described and ascertained in and by the following statement.

In the *Bulletin de la Société Chimique de Paris* (3) 15, p. 371 and in the *Berichte* Vol. 29, p. 695, Reyschler describes a process for the manufacture of camphene by heating alkali phenolate, from which the water has been removed, with pinene hydrochlorid. Also the Badische Anilin-and Soda-Fabrik of Ludwigshafen am Rh. has described in their patent specification for England No. 16429 (06) a process of manufacturing camphene by heating pinene hydrochlorid with an aqueous solution of an alkali phenolate in an autoclave.

I have discovered that by heating a mixture of phenol, calcium oxid and pinene hydrochlorid under ordinary or atmospheric pressure, camphene entirely free from chlorin can be obtained.

The calcium oxid, which I use, serves on the one hand to combine with the water contained in the phenol and generated during the reaction, on the other hand to disengage the hydrochloric acid.

It is hardly necessary to mention, that by using such a cheap agent as calcium oxid in place of the alkali used in the processes already named above, it is possible to cheapen very considerably the manufacture of camphene. Furthermore, the tedious operation of distilling off the water formed by the reaction, which is absolutely necessary in Reyschler's process, is altogether dispensed with in my present improvement.

Compared with the said process of Badische Anilin and Soda-Fabrik my present invention has the advantage that the process is performed under ordinary or atmospheric pressure and there is moreover no necessity for increasing the volume of the constituents by adding the not inconsiderable quantity of water. After the reaction is completed, the camphene formed is distilled off direct from the mixture, and can be separated from the phenol, which has been carried away with it, by shaking them together with an alkali solution. The phenol itself can be recovered by the well known treatment.

In place of calcium oxid I may employ stontium or bariumoxid and in place of phenol naphthol can be used.

In the same way as described by this process, the hydrochloric acid of the liquid remaining at the manufacture of pinene hydrochlorid, which contains the latter in a large degree, may be disengaged, and the camphene formed thereby, utilized.

Example 1: 1720 parts of pinene hydrochlorid, 1800 parts of phenol are heated with 600 parts of calcium-oxid for 6 to 7 hours at 180° C in a vessel having an upright condenser, and camphene is afterwards distilled off until the residuum is nearly dry. The distilled liquid requires to be agitated with an aqueous alkaline solution to get rid of the phenol, which has been carried away with it, whereupon the camphene becomes separated from the alkaline phenol solution.

Example 2: 1720 parts of pinene hydrochlorid, 1800 parts of phenol are heated with 1600 parts of barium-oxid, and the mixture treated in the manner described in the foregoing Example 1.

Example 3: 1720 parts of pinene hydrochlorid, 1800 parts of phenol are heated with 1100 parts of strontium-oxid and the mixture treated in the manner described in the foregoing Example 1.

Example 4: 1720 parts of pinene hydrochlorid, 2700 parts of napthol are heated with 600 parts of calcium oxid and the mixture treated in the manner described in the foregoing Example 1.

Example 5: 1720 parts of pinene hydrochlorid, 2700 parts of naphthol are heated with 1600 parts of barium-oxid and the mixture treated in the manner described in the foregoing Example 1.

Example 6: 1720 parts of pinene hydrochlorid, 2700 parts of naphthol are heated with 1100 parts of strontiumoxid and the mixture treated in the manner described in the foregoing Example 1.

Having thus fully described my invention, what I claim as new and desire to secure by Letters Patent, is:—

A process for manufacturing camphene free from chlorin consisting of heating together pinene hydrochlorid, calcium oxid and phenol, distilling off the camphene so formed, and separating phenol therefrom by shaking out in aqueous alkaline solution.

In testimony whereof I have signed my name to this specification in the presence of two subscribing witnesses.

Dated this 30th day of October 1906.

FRITZ KOCH.

Witnesses:
H. D. JAMESON,
F. L. RAND.